Feb. 14, 1961 E. J. SCHWAB 2,971,588
SOIL LEVELING MULCHER
Filed May 31, 1956
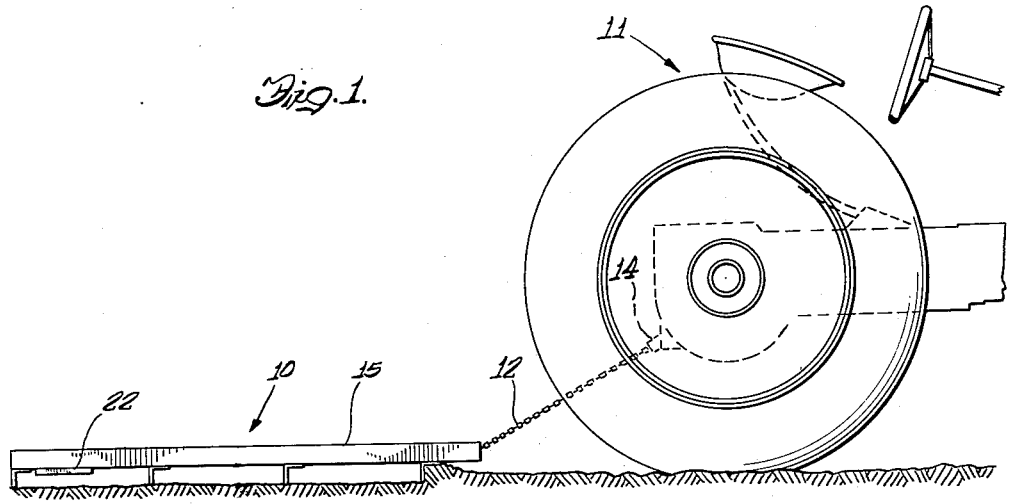
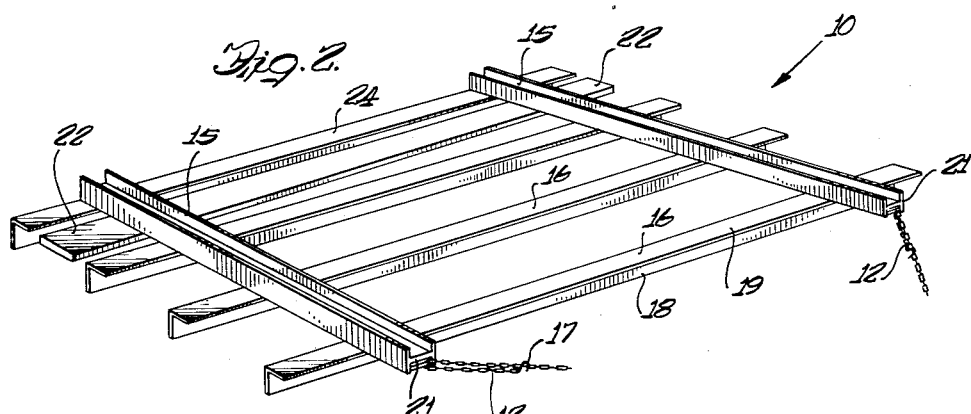
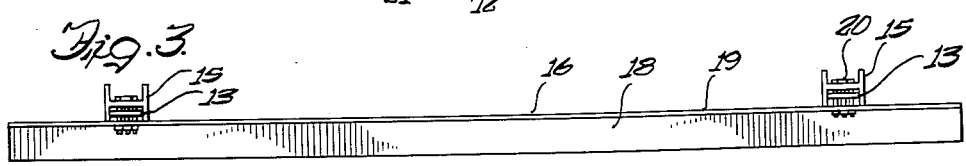
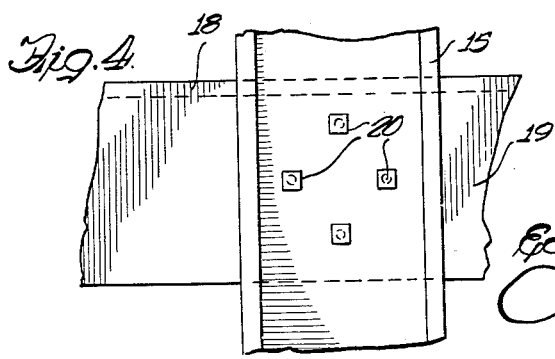
Inventor
Edward J. Schwab
Attorney

United States Patent Office 2,971,588
Patented Feb. 14, 1961

2,971,588
SOIL LEVELING MULCHER
Edward J. Schwab, R.F.D. 1, Shipman, Ill.
Filed May 31, 1956, Ser. No. 588,393
2 Claims. (Cl. 172—146)

The present invention relates to a soil leveling mulcher. The principal utility for the soil leveling mulcher is as an agricultural implement for the preparing of a seed bed and leveling the soil.

After the soil has been roughly prepared for planting, it is highly desirable to fill in the furrows and level off the ridges left by plowing. This greatly assists in aiding accurate planting and cultivating and decreasing the number of trips required around the field with other implements. Also, when the field is properly mulched and leveled, surface drainage is more readily accomplished.

With the foregoing in mind, it is the general object of the present invention to provide a soil leveling mulcher which is simple, rugged, and effectively levels and mulches the soil prior to planting.

Another object of the invention is to furnish a soil leveling mulcher which may be readily assembled from stock parts with a minimum of labor thereby making the implement inexpensive.

A further object of the invention is to provide a soil leveling mulcher which tracks closely and accurately behind its associated prime mover.

Further objects and advantages of the present invention will become apparent as the following description of an illustrative embodiment proceeds taken in conjunction with the accompanying illustrative drawings in which:

Figure 1 is a side elevation of a tractor drawing the soil leveling mulcher illustrative of the invention.

Fig. 2 is a perspective view of the soil leveling mulcher showing a portion of the drag chain.

Fig. 3 is a front view of the soil leveling mulcher.

Fig. 4 is an enlarged broken view showing a typical joint where the ground engaging blades are secured to the frame members.

In broad outline, the illustrative soil leveling mulcher contemplates a plurality of parallel ground engaging blades oriented to engage the ground frontally. The blades are secured to bases, shown here as angle iron legs, which in turn are secured to perpendicular parallel frame members. A drag chain is then secured to the forward ends of the frame members for towing the implement behind a tractor.

By referring to Figures 1 and 2 of the drawings, the components of the implement and their assembled operating relationship will be better appreciated.

The implement 10, a soil leveling mulcher is secured to a tractor 11 by means of a drag chain 12 which is fixed to the drag bar clevis 14 of the tractor 11. A pair of parallel frame members 15 shown here in the form of I-beams are oriented parallel to the longitudinal direction of motion of the soil leveling mulcher and near the ends of the blade assemblies 16. The blade assemblies 16 contemplate a downwardly projecting blade portion 18 and the blade support 19. In the present instance the blade assembly is in the form of an angle iron. The frame member I-beams 15 are secured to the blade assembly support 19 by means of a plurality of bolts 20. The drag chain 12, shown here as a single length of log chain, is secured at its ends to the forward end 21 of the I-beam frame members 15. The log chain may be secured by means of wrapping the chain around a transverse pin 13 in the forward portion 21 of the frame members 15. The effective length of the chain 12 may then be varied by the use of the log hook 17.

Before discussing the various dimensions and proportions which have proved operationally successful, it will be helpful to understand the cooperative relationship of the various components of the soil leveling mulcher. As the soil leveling mulcher is dragged forwardly behind the tractor 11, the forward blade engages the soil. The weight of the soil leveling mulcher 10 is sufficient to depress it down through loose soil so that an accumulation of soil will pile up in front of the forward blade. The same action may take place to a limited or greater extent in front of the remaining blades. When the first blade comes to a high spot in the ground it will raise up the forward portion of the implement causing the trailing blades to raise up and unload a portion of the soil which they have collected. When the forward blade has crossed the high spot it will drop its load of soil at the same time the succeeding blades are crossing the high spot which will cause them to fill up with soil. As the middle blades are filling up with soil, this action causes the trailing blade to raise and unload its soil. Thereafter the middle blades cross the high spot and are caused to raise at the same time the trailing blade is on the ridge filling up with soil.

The same function takes place with regard to leveling in a low spot, as each ridge presupposes adjacent low spots.

The weight of the unit also assists in the leveling function. As the forward blade is on a high spot it causes the middle blades to leave the ground, thereby shifting the weight of the implement to the forward blade which assists in filling it with a load of soil which will subsequently be deposited as the middle blades engage the high spot. By the same token, when the middle blades are on the ridge, the weight of the unit is shifted to the middle blades from the forward and trailing blades, thereby assisting the middle blades in accumulating a load of soil.

In certain instances it may prove desirable to affix a plank 22 beneath the longitudinal frame members and abutting the rear blade assembly 24. The function of the plank is to prevent the rear blade from spilling soil over its top and provide a flotation for the unit which counteracts the upward pull which the drag chain 12 asserts on the implement on its forward portion.

In order to achieve the foregoing desirable operational characteristics, it has been found that certain dimensions and proportions of the unit provide superior results. The blade assembly is fashioned from an angle iron which may be either 10, 12, or 14 feet in length, depending upon the size of the tractor 11. The blade portion 18 of the angle iron is approximately 4 to 5 inches deep, the blade support portion being 6 inches wide. This width of blade support has been found desirable to give a satisfactory lift to the implement as soil is gathered in front of the blade. For light soil which is easy to move, a steel thickness of one-quarter inch will suffice. For soil that is rough and very hard to move, it is desirable to increase the blade thickness to three-eighths inch.

The frame members 15 have been fashioned from an eight-foot I-beam, five inches in depth, with three-inch flanges. The web thickness has been one-quarter inch with the flanges being one-half inch at the center tapering with one-quarter inch at their edges. Channel iron may be substituted for the I-beam, if desired.

The placing of the blades may prove critical. It has been found that if the blades 18 are on centers varying from eighteen to twenty-four inches that the best results occur, particularly when four blades are used. The I-beam frame members 15 are secured thirty inches from the ends of the blades 18. The bolts 20 employed at the joints of the blade assembly 16 and the frame members 15 should be of a quantity and size sufficient to support the load. In the present instance shown three blades are employed adjacent the inner portion of the implement, with one blade being employed at the outer portion of the implement.

The log chain of fifteen feet in length with a single center link at its forward portion of three inches in diameter has been found most satisfactory and will accommodate the clevis of most tractors.

Although the desirable number of blades is four, the addition of more blades will not severely hinder the operation of the soil leveling mulcher 10. If the number of blades, however, is reduced below the illustrated 4 the unit has a tendency to tip and pitch.

When the soil leveling mulcher is used in preparing a seed bed and leveling the soil, it is normally dragged across furrows or diagonal to the furrows. In either direction the design of the unit, particularly by virtue of the rectangular relationship of the components, prevents the soil leveling mulcher from jumping and swaying. Repeated use has indicated that the most desirable direction of traversing a field is diagonal to the furrows.

Although particular embodiments of the invention have been shown and described in full here, there is no intention to thereby limit the invention to the details of such embodiments. On the contrary, the intention is to cover all modifications, alternative embodiments, usages and equivalents of the soil leveling mulcher as fall within the spirit and scope of the invention, specification, and appended claims.

I claim as my invention:

1. A soil leveling mulcher comprising, in combination, four parallel blades, a support base for each blade rigidly secured to said blade and extending forwardly to form a shelf, a frame for said blades and the support bases attached thereto, said frame including a pair of parallel members, means securing said blades and support bases beneath and to the frame members in rectangular fashion, said support bases being spaced to provide rectangular open areas between the support bases and open-end portions between the ends of the blades, said blades being perpendicular to the direction of travel and the frame members parallel to the direction of travel, drag means secured at a forward portion of the frame, and a member secured transversely and forward of the rear blade and its support base in the open area forward thereof partially closing said open area to prevent collected earth from spilling over the rear blade and to float the mulcher higher in the rear thereby counteracting the upward pull on the drag means and shifting the static weight of the leveling mulcher forwardly, the various members so oriented and proportioned that the ratio between the depth of the blades and the center distance between the blades falls within the range of 1:3.6 and 1:6.

2. A soil leveling mulcher comprising, in combination, at least four parallel blades formed of angle irons, one leg of each angle iron being oriented forwardly to form a shelf which serves as a support base for the blade, a frame for said blades including a pair of parallel members, means securing the blades to the frame members at right angles and defining rectangular open areas between blade supports with the blades being perpendicular to the direction of travel and the frame members parallel to the direction of travel, the ratio between the depth of the blades and the center distance between the blades being in the range 1:3.6 to 1:6, drag means secured at a forward portion of the frame, and a member secured transversely and forward of the rear blade and its support base in the open area forward thereof partially closing said open area to prevent collected earth from spilling over the rear blade and to float the mulcher higher in the rear thereby counteracting the upward pull on the drag means and shifting the static weight of the leveling mulcher forwardly.

References Cited in the file of this patent

UNITED STATES PATENTS

| | | |
|---|---|---|
| 119,361 | Hull | Sept. 26, 1871 |
| 920,422 | Boyd | May 4, 1909 |
| 1,070,381 | Averell | Aug. 12, 1913 |
| 1,237,947 | Ort | Aug. 21, 1917 |
| 1,779,548 | Lage | Aug. 30, 1928 |
| 2,817,203 | Sievers et al. | Dec. 24, 1957 |